(12) United States Patent
Törmänen et al.

(10) Patent No.: US 12,204,936 B2
(45) Date of Patent: Jan. 21, 2025

(54) COMPUTER-IMPLEMENTED METHOD FOR PERFORMING A SYSTEM ASSESSMENT

(71) Applicant: Volvo Car Corporation, Gothenburg (SE)

(72) Inventors: Mikael Törmänen, Gothenburg (SE); Anders Hägglund, Gothenburg (SE); Johannes Emilsson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 498 days.

(21) Appl. No.: 17/699,385

(22) Filed: Mar. 21, 2022

(65) Prior Publication Data
US 2023/0297418 A1   Sep. 21, 2023

(51) Int. Cl.
G06F 9/48     (2006.01)
G06F 9/445    (2018.01)

(52) U.S. Cl.
CPC ........ G06F 9/4881 (2013.01); G06F 9/44505 (2013.01)

(58) Field of Classification Search
CPC .................................................. G06F 9/4881
See application file for complete search history.

(56) References Cited

U.S. PATENT DOCUMENTS

2023/0401093 A1*  12/2023  Wang ........................ G06F 9/52

* cited by examiner

*Primary Examiner* — Charlie Sun
(74) *Attorney, Agent, or Firm* — Clements Bernard Walker; Christopher L. Bernard; Devin Cummins

(57) ABSTRACT

A computer-implemented method including creating at least one run configuration package including at least a specification hierarchy, creating an application protocol interface including a generic code portion and an application-specific code portion, receiving an input for building an assessment environment from the run configuration package referencing an assessment application tool via the application protocol interface, and building the assessment environment based on the input. The assessment environment receives inputs using a standardized format, modifying various aspects of the assessment, based on the information in the specification hierarchy. The specification hierarchy is linked to a plurality of specification data objects for setting the assessment environment. The generic code portion is configured to provide a standardized instruction to the application-specific code portion and the application-specific code portion is configured to modify a format of the plurality of specification data objects linked to the specification hierarchy for the assessment application tool to be utilized.

19 Claims, 3 Drawing Sheets

COMPUTER-IMPLEMENTED METHOD FOR PERFORMING A SYSTEM ASSESSMENT

TECHNICAL FIELD

The present disclosure relates to a computer-implemented method for performing a system assessment, a computer program element for performing a system assessment, a computer storage media and a computer system including such computer storage media.

BACKGROUND

In engineering, computational analysis is carried out for a purpose of predicting performance or property of a technical system, which typically depends on many aspects such as an exact configuration of each subsystem of the technical system, different measurements to record during or after a simulation, precision required by the solver, initial and environmental conditions, and a precise load-case of the system. This may be reflected as a set-up or a configuration of the simulation.

Practically, the computational analysis requires setting up a numerical model of the technical system, populating it with suitable parameters, subjecting it to intended initial and boundary conditions, choosing a suitable solver system, deciding a hardware and evaluating results. This means, each step of the simulation requires input or configuration data and decisions. Traditionally, this information, i.e. configuration data has been collected from wherever it originates, and inserted into a context of the simulation, and the simulation is carried out. In case a subsequent analysis is requested, the corresponding entities need to be altered, and the simulation is to be repeated.

There are simulation systems, which allow for a more modular approach of the subsystems, where a part of the configuration can be altered without changing the entire data set. These systems are tailored for a specific simulation domain, and generally split the configuration in parts that more or less match different physical domains.

SUMMARY

Hence, there may be a need to provide an improved method for preparing and executing a system assessment, which may optimize a utilization of a wide variety of data.

The problem is at least partially solved or alleviated by the subject matter of the independent claims of the present disclosure, wherein further examples are incorporated in the dependent claims. It should be noted that the aspects of the disclosure described in the following apply to the computer-implemented method for performing a system assessment, the computer program element for performing a system assessment, the non-transitory computer storage media and the computer system including such non-transitory computer storage media.

The computer-implemented method includes creating at least one run configuration package including at least a specification hierarchy, creating an application protocol interface including a generic code portion and an application-specific code portion, receiving an input for building an assessment environment from the run configuration package in an assessment application tool via the application protocol interface, and building the assessment environment based on the input. The specification hierarchy is linked to a plurality of specification data objects for setting the assessment environment. The generic code portion is configured to provide a standardized instruction to the application-specific code portion and the application-specific code portion is configured to modify a format of the plurality of specification data objects linked to the specification hierarchy for the assessment application tool to be utilized.

The computer-implemented method according to the present disclosure may provide a template for the system assessment, which allows a standardized configuration and/or execution of the system assessment. Accordingly, the system assessment may be optimized by loading specification data objects required for performing the system assessment via the template, which may allow an automation of the entire system assessment. Thus, a saving of time, storage and/or processor capacity may be achieved. Additionally, a user, who does not possess extensive knowledge of the system assessment may easily accomplish the system assessment.

To understand or predict a technical object or a technical system, computational analysis may be performed. For instance, the system assessment may be applied for predicting and/or analyzing a crash event of a vehicle, a driving performance of the vehicle, etc.

The run configuration package may be adapted to provide information for performing the system assessment regarding the assessment application tool to be utilized, the assessment environment to be set up, system and parametric specifications to be applied in the system assessment, requirements for analyzing and reporting etc. The run configuration package may include such information by means of a mask, which may be standardized and act as a global template for the system assessment. Accordingly, a user may be able to easily launch a system assessment independently of an object or a system to be simulated, an assessment tool to be utilized, a test environment and/or test parameters.

The run configuration package may be generated automatically or manually. The run configuration package may form a foundation for building and executing the system assessment. The run configuration package may reference or indicate a particular work order forming the specification hierarchy. In other words, the run configuration package may include at least a specification hierarchy, which may provide entire technical information necessary to perform the system assessment. The technical information may define specifications such as a particular aspect of analysis including environment, system configuration, sensor technology, test sequence, use cases, post-processing, reporting, experiment set-up, etc. contained in the plurality of specification data objects.

The specification hierarchy may be a specification organization structure, which may allow an establishment of a modulated set of specification data objects. The specification hierarchy may reference and/or load the plurality of specification data objects. The specification hierarchy may include several information layers to facilitate a transfer of specification data objects to the assessment application tool.

Among the several information layers, only a top information layer of the specification hierarchy may communicate with the assessment application tool for providing the specification data objects. However, the top information layer may only indicate the specification data objects required for setting and/or performing the assessment environment but not store any specification data set. In other words, the top information layer may serve as an interface between the assessment application tool and data sets of the specification data objects.

Conventional simulation tools utilize generally monolithic data set for configuring and executing a simulation, which is often stored as a single data file containing entire information. A different analysis may, thus, require another set of data, which may differ only in few modified parts. The unmodified parts of the new data set carry duplicate information without reference to each other between the contexts used. Apart from occupying more space, the duplicate information may not be separately extracted from the monolith data set, therefore it is hard to keep up to date. After some time, this can lead to a large number of variations of the monolith data set.

The application protocol interface may be a part of a process scheduler. The process scheduler may apply a multi-disciplinary design optimization process. The application tool may be developed in Python, Perl, Ruby or the like.

The process scheduler may include, for instance, modules for the execution steps such as configuring, building, running, analyzing the system assessment, modules containing tool-specific sub-classes of the individual steps, extending the functionality for each tool integration, a session handler sub-package for treating a state of an ongoing simulation, examples for implemented environments, utility functionality, handling format translations, mathematical conversions, package files for requirements, building and testing code, documentations etc.

Generally, to build an assessment environment and/or execute the system assessment, an assessment application tool, in other words simulation tool such as MATLAB, ANSYS, Simpy, etc. may be applied. Each assessment application tool, however, may require its own data format. Such application-depending format is generally difficult to share between different assessment application tools. Hence, the data files may often have to be adapted individually for the assessment application tool, which may lead to generating duplicate information demanding a large data storage capacity.

Hence, the application protocol interface may be configured to interface between the specification data objects to be collected to perform the system assessment and the data set of the assessment application tool. The application protocol interface may be divided by the generic code portion and the application-specific code portion. In other words, the application protocol interface may be instantiated from the generic code portion which may be extended by the application-specific code portion.

The generic code portion may be a tool agnostic part and configured for a generic specification interpretation. The generic code portion may be defined by a modular code framework containing general code taking care of all settings that are generic regarding the user, the platform and the system.

Whereas the application-specific code portion may be adapted for each assessment application tool requirements, to take care of the tool-specific settings. Particularly, the application-specific code portion may be configured to modify the format of the specification data objects with respect to the assessment application tool to be utilized. In other words, the application-specific code portion may include codes for modifying the format of the specification data objects with respect to the assessment application tool to be utilized.

Hence, the specification data objects linked to the specification hierarchy of a designated run configuration package may be interpreted by the generic code portion and their format may be converted to a format compatible with the assessment application tool to be utilized. Accordingly, the application protocol interface may allow a unified interface between the specification data objects and various assessment application tools. As a result, the specification data objects may not need to include the format for each individual application tool and universally applied in any assessment application tool.

The specification data objects including the application tool-specific data may be transferred to the assessment application tool as an input for configuring the assessment environment. Thus, the assessment application tool may be capable of setting up, or building, the assessment environment based on the input adapted and/or optimized to the assessment application tool.

In an example, the run configuration package further includes process scheduler information. The process scheduler information of the run configuration package may provide, for instance, a specific version of the process scheduler to be utilized for performing the intended system assessment.

The run configuration package further includes the specification hierarchy. The specification hierarchy may provide, for instance, a name of the assessment application tool to be utilized for performing the system assessment, its version, etc.

Accordingly, the run configuration package including the specification hierarchy and the process scheduler information may provide entire configuration information necessary to perform the system assessment. Hence, any confusion relating to the process scheduler may be avoided and a traceability of the process scheduler may be facilitated.

In an example, the specification hierarchy includes several information layers for modulating the plurality of specification data objects based on a specification to be applied in a physical test environment. For instance, the specification hierarchy may include at least three information layers. The first information layer may be configured to reference one or more specification data objects to be applied in the intended system assessment, wherein the specification data objects may be classified based on a specification to be applied in a physical test environment. The first information layer may serve as a passage for transferring the specification data objects to the assessment application tool via the application protocol interface.

To the first information layer, a second information layer may be linked for loading the specification data objects referenced in the first information layer. Further, to the second information layer, a third information layer may be linked for loading at least one, preferably several data sets of the specification data objects loaded in the second information layer.

Conventional simulation tools utilize generally a monolithic data set for configuring and executing a simulation, which is often stored as a single data file containing entire information. However, by defining the information hierarchy of the specification data objects to be sent to the assessment application tool, the assessment application tool may not need to access a stored monolithic data set for configuring and executing the simulation, which may improve process efficiency and reliability.

In an example, the method further includes storing the plurality of specification data objects as data records or posts in a database. In an example, the method further includes storing the plurality of specification data objects as individual data files in a computer storage media such as internal to a computing device, e.g. a computer's SSD, or a removable device, e.g. an external HDD or universal serial bus (USB) flash drive.

In an example, the method further includes classifying the plurality of specification data objects by tool installation data, tool configuration data, model parameters, test methods, excitation levels, pre- and post-processing scripts and simulation settings. In other words, the plurality of specification data objects may be modulated with respect to the real test environment, and each categorized specification data object may be individually selected for preparing the assessment environment. The specification data objects may include specification files. Thus, a quick access to the specification data objects and better understanding of each specification data object may be achieved.

In an example, the method further includes installing the assessment application tool based on the run configuration package. Particularly, a specification data object defining the assessment application tool may be referenced in the specification hierarchy of the run configuration package. The process scheduler may install the selected application assessment tool at a computer executing the system assessment, wherein the computer may be a local computer and/or connected via a network.

In an example, the method may further include receiving the input for building the simulation environment only from the run configuration package. The assessment application tool for performing the system assessment may have only the access to the run configuration package. Specifically, the assessment application tool may be only connected to the first, i.e. top information layer of the specification hierarchy referencing one or more specification data objects necessary to build the assessment environment via the application protocol interface, which may modify the format of the referenced specification data object according to the assessment application tool to be utilized.

In other words, the run configuration package may be the sole input to the application tool and act as a "single source of truth". Accordingly, the application tool may not need to access entire monolithic data set for configuring and executing the simulation, which may improve process efficiency and reliability.

In an example, the method further includes executing the system assessment based on the run configuration package. The process scheduler including execution steps of the system assessment may prompt the assessment application tool to run the simulation once the assessment environment is built. Since such execution steps are defined in the process scheduler, the steps from installing the assessment application tool, building the assessment environment to executing the system assessment may be performed automatically.

In an example, the method further includes modifying the assessment environment using a standardized input template including parametric and/experimental information compiled during building the assessment environment from the specification hierarchy. Accordingly, the assessment environment may be modified according to the purpose of the intended system assessment without recompiling the assessment environment. Thus, this may enable parametric studies and optimization when performing the system assessment.

In an example, the method further includes referencing two or more run configuration packages in a Meta layer. The Meta layer may include at least two run configuration packages, each of which define an individual system assessment. For instance, the two configuration packages may differ from each other in the assessment application tools, test objects, particular specification requirements and/or parametric setting.

To perform the system assessment at the Meta layer level, a Meta manager unit may be provided. The Meta manager unit may include, for instance, command-line interfacing, including help and instructions, runner configuration, single runner configuration template builder including default version of packages, package management including installing, verifying process scheduler, database manager including version control interfacing, runner, executing analyses through the process scheduler or the like.

In an example, the method further includes executing the system assessment of run configuration packages referenced in the Meta layer in parallel. The Meta layer may be particularly configured to perform two or more system assessments simultaneously and/or consecutively, each of which is defined in the respective run configuration package. The Meta manger unit may generate and/or provide an automated scheduling of the several system assessments, which may enable multiple batch runs on high performance computing clusters.

In an example, the method further includes reading at least one output of the system assessment and modifying the at least one output to include a predefined output format via the application protocol interface. The process scheduler may also include codes for automatically collecting output generated by the system assessment, wherein the output may include a specific data format of the respective assessment application tool.

Accordingly, the format of the output may be modified through the application protocol interface and the output may include a format predefined in the respective run configuration package, particularly in the specification data objects. Thus, even though several system assessments are performed by diverse assessment application tools from different engineering perspectives, their output may include a uniform format, which may lead to an efficient combination of the computational results from the different engineering domains.

The same may also apply to the system assessment in the Meta layer that the outputs of individual system assessments with the respective run configuration packages may include the same format. Accordingly, a direct analysis and/or evaluation of the system assessments may be available.

In an example, the predefined output format is an application tool-independent format. The application protocol interface may be configured to modify the output of the system assessment, such that the output may include a format, which is independent of the application tool. In other words, the application protocol interface may be able to standardize the output format. The output may be, for instance, a key performance indicator (KPI) referring to key figures that can be used to measure and/or determine a progress or a degree of fulfillment with regard to important objectives or critical success factors within a system.

Accordingly, the Meta manager modifying, executing, and monitoring two or more system assessments of run configuration packages may provide a multi-disciplinary assessment, i.e. Multi-disciplinary Design Optimization.

In an example, the method further includes analyzing and reporting of the system assessment based on the output. A specification data object of the run configuration package may also include a script for post-processing, i.e. analyzing and/or reporting the output of the system assessment. The process scheduler may interpret such specification data object and run corresponding steps for analyzing and/or reporting. Since the output may include a standard format, the analysis and/or evaluation of the outputs may be easily performed. In the reporting, the result may be represented as a table, a graphic and/or text. The result may compare and/or plot the output with the input, e.g. run configuration package.

In an example, the method further includes version controlling the run configuration package. In an example, the method further includes version controlling the Meta layer. The term "version controlling" may be understood in that changes of data stored in the database may be controlled and tracked. Each newly generated version may be saved in an archive with a number or letter code. For instance, if a first change is made in an individual data set, the changed data set may be identified by "ver. 2".

Accordingly, any change of an initial or present data set of a run configuration package may initiate to create a new version of said data set, which may cause, in turn, a version control of the specification data object and subsequently the run configuration package and the Meta layer. By updating and creating new version(s) of each of the specification hierarchy, the run configuration package and the Meta layer, an evolution of information, normally reflected by its filename, may be easily tracked by the history itself and the hierarchy of specifications. Hence, traceability of the changes in the data sets and/or the specification data objects may be improved. As a result, the evolution of the simulation environments can be tracked uniquely.

According to the present disclosure, a computer program element for performing a system assessment is presented. The computer program element is adapted to perform the method steps as described above, when being executed by a processing element.

According to the present disclosure, one or more computer storage media is presented. The computer storage media is encoded with instructions, that when executed by a computer, cause the computer to perform the operations of the respective method as described above.

The storage media may include internal to a computing device, such as a computer's SSD, or a removable device such as an external HDD or universal serial bus (USB) flash drive. There are also other types of storage media, including magnetic tape, compact discs (CDs) and non-volatile memory (NVM) cards.

According to the present disclosure, a computer system is presented. The system includes one or more computer storage media as described above and a computer for executing the instructions.

It should be noted that the above examples may be combined with each other irrespective of the aspect involved. Accordingly, the method may be combined with structural features and, likewise, the system may be combined with features described above with regard to the method.

These and other examples of the present disclosure will become apparent from and elucidated with reference to the embodiments described hereinafter.

BRIEF DESCRIPTION OF THE DRAWINGS

Examples according to the present disclosure will be described in the following with reference to the following drawings.

DETAILED DESCRIPTION

Figure 1:
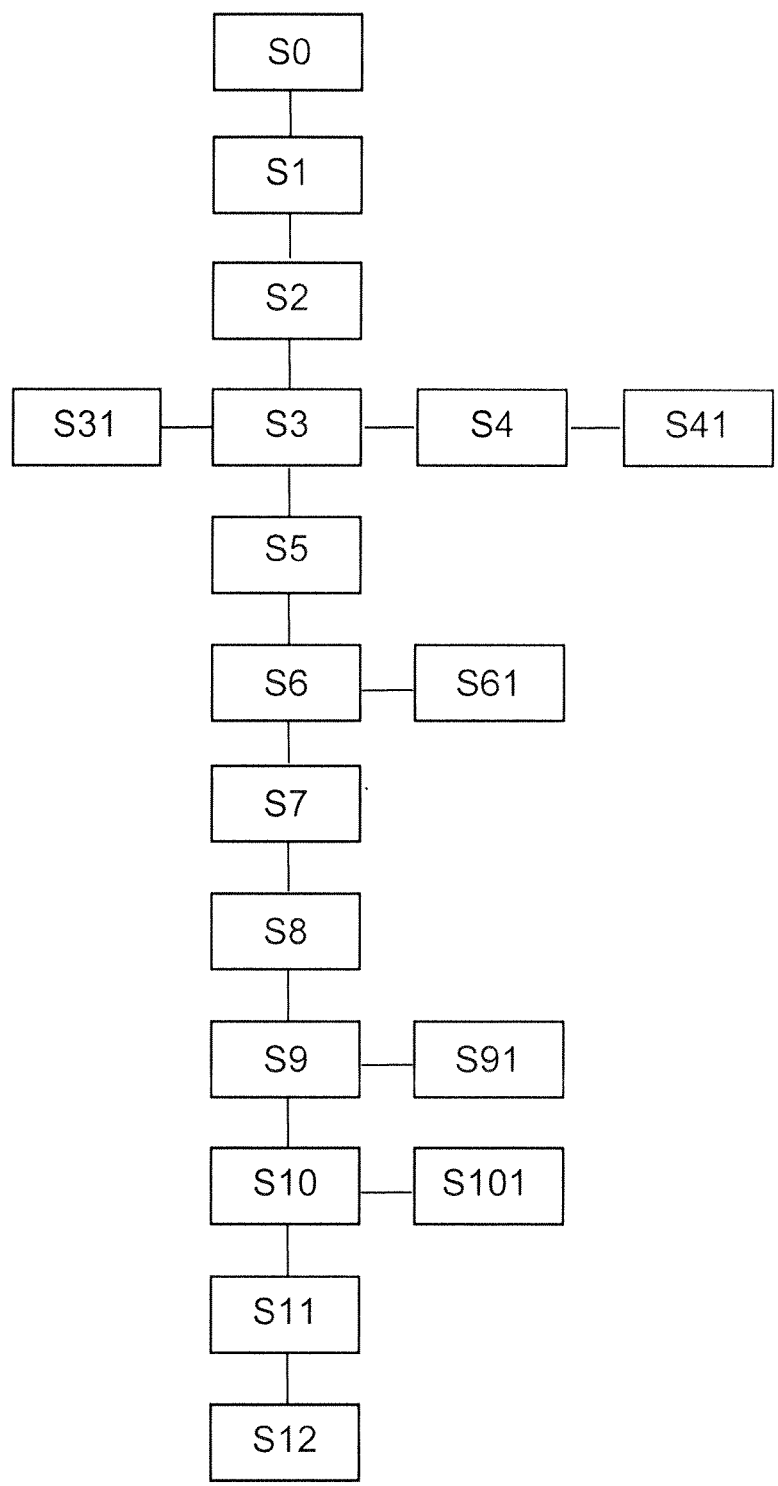
FIG. 1 shows schematically and exemplarily an example of a flowchart of a computer-implemented method for performing a system assessment according to the present disclosure.
Figure 2:
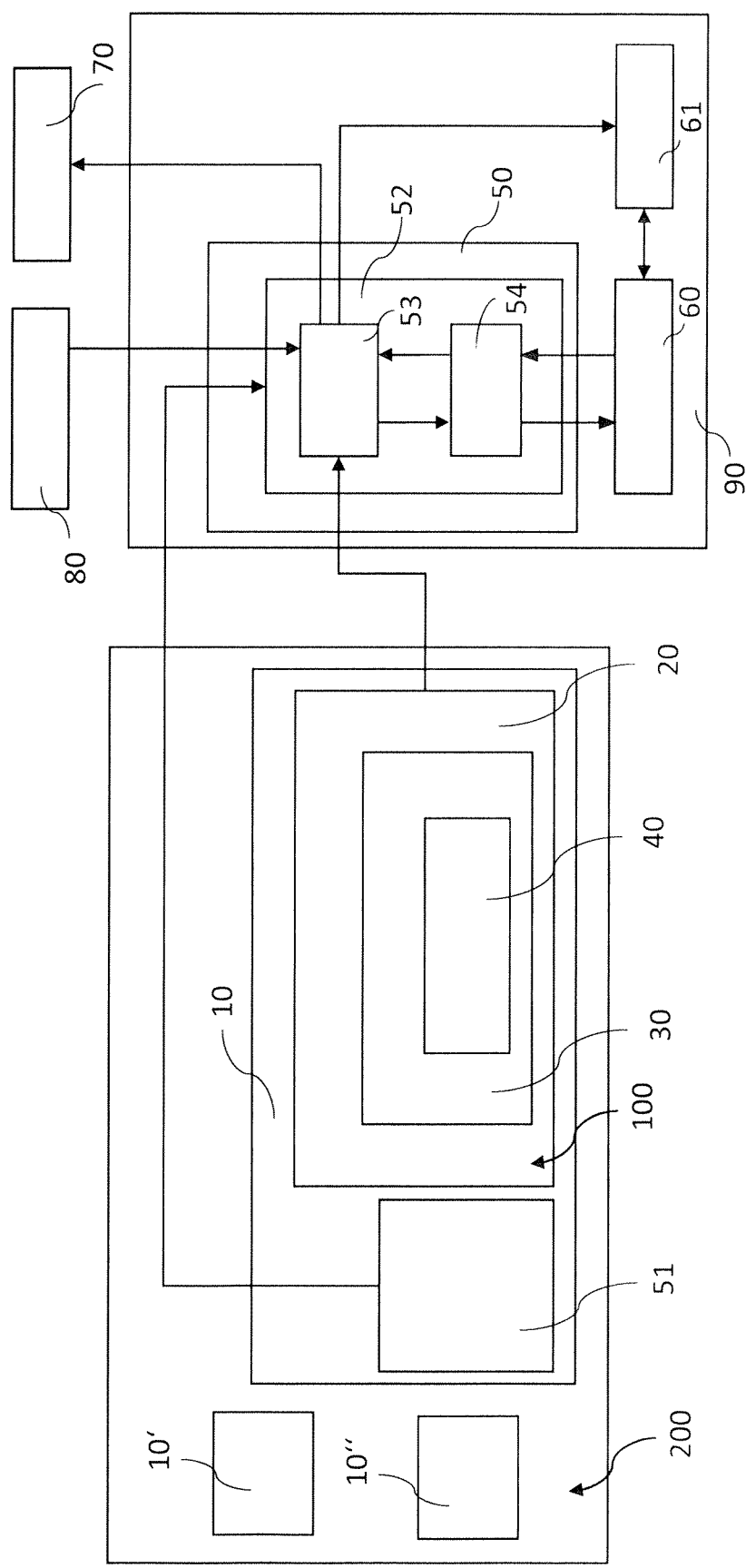
FIG. 2 shows schematically and exemplarily an example of a computer-implemented method for performing a system assessment according to the present disclosure.

FIG. 1 and FIG. 2 show a computer-implemented method for performing a system assessment according to the present disclosure. The method may be adapted to understand or predict a technical object or a technical system based on information defining the system to be analyzed and its environment, for instance predicting and/or analyzing a crash event of a vehicle, a driving performance of the vehicle, etc. The method may be performed not necessarily in this order.

Each element in FIG. 1 in combination with FIG. 2 indicates:

S0 storing a plurality of specification data objects as data records or posts in a database and/or as individual data files in a computer storage media;

S1 creating a specification hierarchy 100 including several information layers 20, 30, 40 for modulating the plurality of specification data objects based on a specification to be applied in a physical test environment;

S2 classifying the plurality of specification data objects by tool installation data, tool configuration data, model parameters, test methods, excitation levels, pre- and post-processing scripts and simulation settings;

S3 creating at least one run configuration package 11,
wherein the run configuration package 11 the specification hierarchy 100 and a process scheduler information 51, and the process scheduler information 51 includes information of the process scheduler 50 to be utilized for the system assessment;

S31 version controlling the run configuration package 11;

S4 referencing two or more run configuration packages 11', 11" in a Meta layer 200;

S41 version controlling the Meta layer 200;

S5 opening a process scheduler 50 based on the run configuration package 11;

S6 creating an application protocol interface 52 including a generic code portion 53 and an application-specific code portion 54;
the generic code portion 53 is configured to provide a standardized instruction to the application-specific code portion 54
the application-specific code portion 54 is configured to modify a format of the plurality of specification data objects linked to the specification hierarchy 100 for an assessment application tool 60 to be utilized;

S61 creating a standardized input template 80 based on the run configuration package 11, particularly based on the parametric and/or experimental specification data objects;

S7 installing the assessment application tool 60 based on the run configuration package 11,
the application tool requires data 81 retrieved and/or located to be accessible for functioning the application tool;

S8 receiving an input for building an assessment environment 90 from the run configuration package 11 referencing the assessment application tool 60 via the application protocol interface 52;

S9 building the assessment environment 90 based on the input;

S91 modifying the assessment environment 90 using the standardized input template 80;

S10 executing the system assessment based on the run configuration package 11;

S101 executing the system assessment of run configuration packages 11, 11', 11" referenced in the Meta layer 200 in parallel;

S11 reading at least one output 70 of the system assessment and modifying the at least one output to include a predefined output format via the application protocol interface 52, wherein the predefined output 70 format being an application tool-independent format;

S12 analyzing and reporting of the system assessment based on the output 70.

Accordingly, a standardized approach for performing a system assessment may be achieved. The system assessment may be optimized by loading specification data objects required for the system assessment via a template, which may lead to a saving of time, storage and/or processor capacity. This aspect-oriented approach enables a reuse and sharing of relevant specifications across domains and environments. In addition, the information provided by the specifications may be compatible with different simulation tools and serve as a common information source. Additionally, a user, who does not possess extensive knowledge with the system assessment may be easily accomplish the system assessment. Further, a complete automation of the system assessment may be realized.

Figure 3:
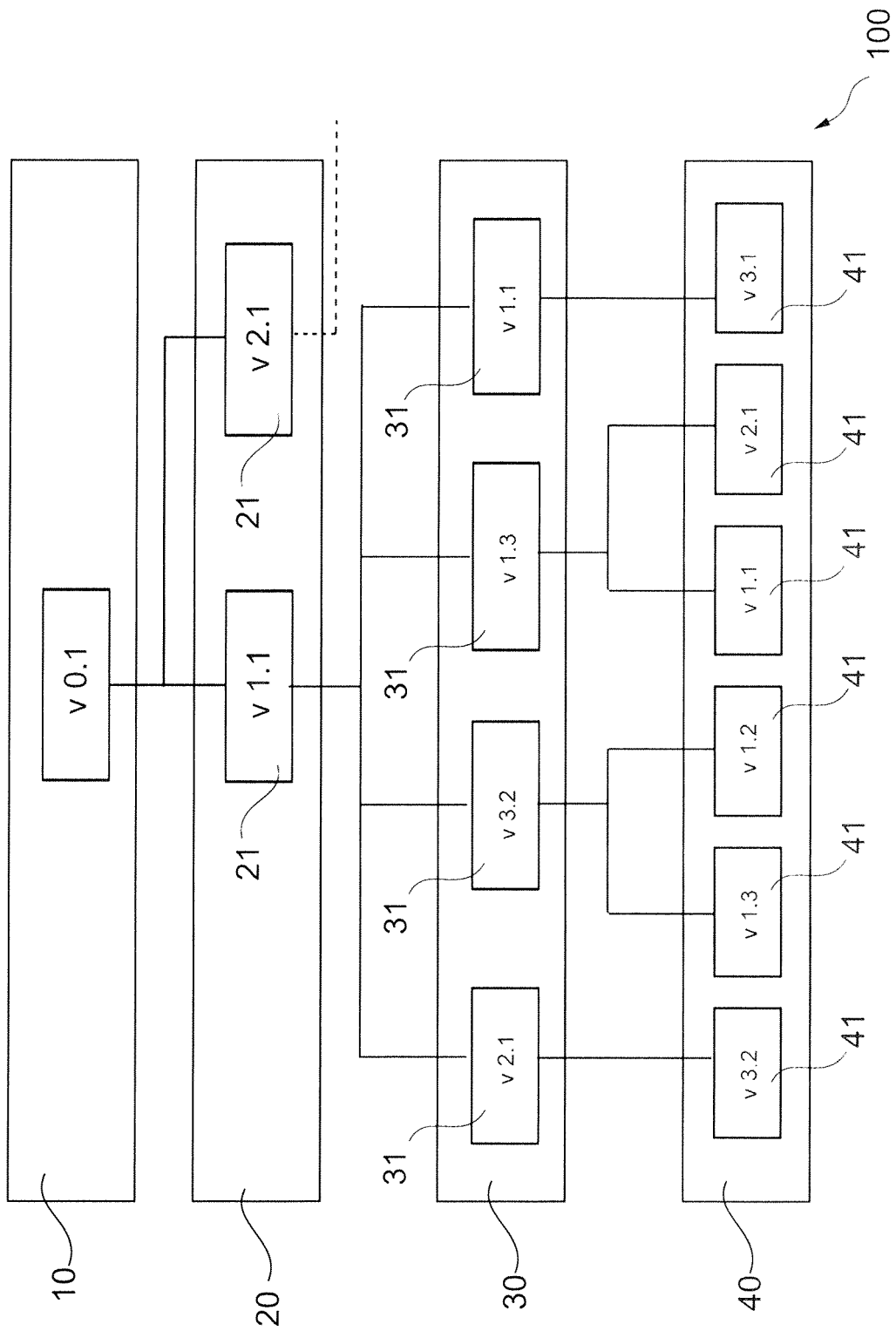
FIG. 3 shows schematically and exemplarily an example of a specification hierarchy according to the present disclosure.

As shown in FIG. 3, the information provided to perform the system assessment may be constituted in a specification hierarchy 100 including several information layers. At a top of the information hierarchy 100, a first information layer 10, i.e. a run configuration package 11 is arranged. The first information layer 10 of the information hierarchy 100 is, thus, linked to a plurality of specification data objects for setting an assessment environment 90 and provides information of the application tool to be utilized for the system assessment. Following the first information layer 10, a second information layer 20 is arranged. The second information layer 20 includes at least a work order 21 including a package of one or more specification data objects 31.

Following the second information layer 20, a third information layer 30 is arranged. The third information layer 30 is configured to load each specification data object 31 referenced in the second information layer 20. In other words, all of the specification data objects 31 indicated in the second information layer 20 as necessary information for building the assessment environment 90 are collected in the third information layer 30.

At the bottom of the information hierarchy 100, a fourth information layer 40 is arranged. The fourth information layer 40 is configured to load one or more data sets 41 of at least one specification data object 31 loaded in the third information layer 30. Accordingly, the application tool for performing the system assessment may obtain full information necessary to build the assessment environment 90. Additionally, the information hierarchy 100 may include further information layers providing information to the third information layer 30.

In addition, the specification hierarchy 100 may further include Meta layer including two or more run configuration packages. An uppermost layer of the specification hierarchy 100, which may be the Meta layer, the run configuration package 10 and/or the work order 20, may be the sole input to the application tool and act as a "single source of truth". Accordingly, the application tool may not need to access entire monolithic data set for configuring and executing a simulation, which may improve process efficiency and reliability.

Since all of the first, second, third and fourth information layers 10, 20, 30, 40 are configured to be version controlled individually, an evolution of the simulation environments can be tracked uniquely. In particular, by updating and creating new version(s) of each of the first, second and third information layers, the evolution of information, normally reflected by its filename, may be easily tracked by the history itself and the hierarchy of specifications. As a result, traceability of the changes in the data sets and/or the specification data objects can be improved.

There are some examples of use cases of the computer-implemented method according to the present disclosure:

Example 1

Specifying a simulation environment: Person AA develops a simulation model and publishes it in a model repository, a version controlled database. AA defines also a simulation environment where this model is used by defining a) the "rig" setup specification describing the tool version, its installation, execution parameters such as solver settings etc., b) the "test object" setup specification pointing to all model information such as repository paths etc., c) the "test method" setup specification describing how the "test object" is run by the "test rig", d) the "drivecases" setup specification that the "test method" consists of, e) the "actuators" setup specification which describes how the "test object" is excited in the specific "drivecases", f) the "sensors" setup specification defining all data to be collected, g) the "report" setup specification defining what data to post-process, analyze and create readable report from, h) the "parameters" setup specification describing which data in the "test" that can be varied. Person AA can now automatically configure the simulation environment for the specified computational platform, and execute the simulation using the batch automation capabilities in the framework, meaning that no graphical user interface is needed, removing the "clicking" a standard tool interface requires. The batch automation can be run multiple times where parameter changes can be done for the different runs, enabling design of exploration or optimization. Since it is easy to re-create the simulation data, it can be deleted after the assessment is finished in order to save space.

Example 2

Reusing information: Person BB wants to analyze another "test object" in the same context as person AA has defined. This is simply done by reusing all information from example 1 except the "test object" specification that needs to be copied and modified to point to another simulation model. Then it is possible to make a similar assessment as person AA has done by automatically configuring and executing the slightly modified test setup.

Example 3

Simplifying Hand-off: Person AA has planned a vacation, however, the work is not finished and need to be transferred to a colleague, person BB. Since person AA has defined the simulation environment with a set of specifications describing the content, it is very easy to re-create this environment using the capability in the framework and continue the work from where person AA left.

Example 4

Sharing Computer Aided Engineering (CAE) Process: Person AA has been asked to join a Multi-disciplinary Design Optimizations (MDO) project but has no time to participate. Instead, AA prepares an adequate simulation environment and generate specifications for the automation framework and distributes them to the coordinator of the project who can implement and execute the defined simulation within the MDO project. This is referred to as sharing expert knowledge to non-experts. When the MDO work has found promising design candidates, person AA will be asked to review them more thoroughly and validate them from the expert point of view. This kind of sharing of CAE processes is also referred as CAE Democratization.

Example 5

Checking simulation tool updates: When an update of the commercial tool is available, it is easy to check and validate its functionality by altering the settings in the "rig" specification and rerunning reference simulations. Thereby it is possible to track these kinds of changes more systematically, and quality ensure the simulation environment in a better way. If there is a need to re-assess historical simulations, just modify the "rig" specifications of the concerned jobs, and rerun them.

Example 6

Trim generic settings: It may be possible to a) trim the actuators in the test rig setup to get exactly the behavior wanted, b) alter the solver settings to get the fastest simulation for a certain solver error, or c) alter the sensitivity in signal filtering in the post-process to trim the signal shape and thereby also the output readings from the simulation.

Example 7

Continuous Integration Chain: It is also possible to define automated processes that are run by batch users. This ability to share a well-defined process is powerful and a fundamental requirement when driving automated processes as in continuous integration (CI), where traceability and repeatability are crucial.

Example 8

Massive parallelization: When having a well-defined simulation process that is both automatically configured and executed, massive parallelization is possible. On each compatible computing node, the simulation environment using one single source of information can be temporarily create and host. The processes are then injected by different inputs, and the output is thereafter collected and managed together with the inputs in a master design of experiments table. When all simulations are done, the temporary simulation environments are deleted.

Example 9

Parsing templates: A typical simulation consists of tool installation, configuration files, platform environment settings, user settings, etc., in other words, a combination of binary and text files. To parameterize the simulation, text files can be converted to template files including keywords instead of values. Thereby, the information can be altered by changing the different parameters defined in a keyword list which is populated from the information defined in the modular specifications. This concept of changing parameters is implemented as the entry level of an application protocol interface.

In the same way, it is possible to modify anything that is textual. If a new parameter is added to the model, the template would have to be updated to work. When executing these kinds of simulation environments, it is popular to do it in batch mode using scripts. In the same manner as with the environment configuration, the execution script can be created from a template and some keywords. Then the execution of the simulation can be performed using single unified commands, despite differences in setup, and automate it using the information framework. This integration type is suitable for tools that can be pre-configured before compilation and start of simulation.

Example 10

Offline tool interaction: Another way of interacting with a simulation tools, especially those that are encapsulated binaries, could be done by system commands defined by the tool developer. In such cases the default simulation environment has to be launched to be able to modify it, for example, an application engine that is running on a web server. All content is stored in binary format, requiring direct programmatical control of the environment from the system command prompt. For example, in the following pseudo syntax "application-param vehicle_mass=2400", the application with name "application" is instructed to change its parameter "vehicle_mass". In the same way, the simulation is executed by sending an appropriate instruction to the application, for example "application-run end_time=10, time_step=0.1". The parameters within the instructions are populated from the information defined in the modular specifications, and these instructions are adapted to the specific applications in the modular code package addressed for that specific environment.

Example 11

Online tool interaction: It is possible to incorporate methods for online interaction, meaning that it is possible to programmatically control the process online, for example, during simulation requiring internal states, changing excitation, stopping/starting execution, pausing, etc. This can be managed using a specific code package.

The computer-implemented method according to the present disclosure may facilitate thus, comparing new system development with an existing system. Any potential change from current set-ups may be extremely simple to realize in simulation, at a very low cost/effort. Further, an easy access to Multi-disciplinary Design Optimizations (MDO) studies focusing on the output and input rather than the process itself may be achieved. An advanced single disciplinary execution with many runs in parallel may be also possible by executing all relevant test objects simultaneously. A simple massive parallelization for sensitivity studies may be achieved as well, due to the automated set-up and execution on all available compute nodes. In addition, a single shot execution for debugging or detailed analysis, including Integrated Development Environment (IDE) or Graphical User Interface (GUI) interaction for developing the analyses for different domains may be facilitated.

It has to be noted that examples of the disclosure are described with reference to different subject matters. In particular, some examples are described with reference to method type claims whereas other examples are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure has been illustrated and described in detail in the drawings and description, such illustration and description are to be considered illustrative or exemplary and not restrictive. The disclosure is not limited to the disclosed examples. Other variations to the disclosed examples can be understood and effected by those skilled in the art in practicing a claimed disclosure, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A computer-implemented method for performing a system assessment comprising:
    creating at least one run configuration package comprising at least a specification hierarchy, the specification hierarchy being linked to a plurality of specification data objects for setting an assessment environment;
    creating an application protocol interface comprising a generic code portion and an application-specific code portion,
    the generic code portion being configured to provide a standardized instruction to the application-specific code portion,
    the application-specific code portion being configured to modify a format of the plurality of specification data objects linked to the specification hierarchy for an assessment application tool to be utilized;
    receiving an input for building the assessment environment from the run configuration package referencing the assessment application tool via the application protocol interface; and
    building the assessment environment based on the input.

2. The computer-implemented method according to claim 1, the run configuration package further comprising process scheduler information.

3. The computer-implemented method according to claim 1, the specification hierarchy comprising several information layers for modulating the plurality of specification data objects based on a specification to be applied in a physical test environment.

4. The computer-implemented method according to claim 1, further comprising storing the plurality of specification data objects as data records or posts in a database.

5. The computer-implemented method according to claim 1, further comprising storing the plurality of specification data objects as individual data files in a computer storage media.

6. The computer-implemented method according to claim 1, further comprising classifying the plurality of specification data objects by tool installation data, tool configuration data, model parameters, test methods, excitation levels, pre- and post-processing scripts and simulation settings.

7. The computer-implemented method according to claim 1, further comprising, receiving the input for building the assessment environment only from the run configuration package.

8. The computer-implemented method according to claim 1, further comprising, installing the assessment application tool based on the run configuration package.

9. The computer-implemented method according to claim 1, further comprising, executing the system assessment based on the run configuration package.

10. The computer-implemented method according to claim 1, further comprising, modifying the assessment environment using a standardized input template.

11. The computer-implemented method according to claim 1, further comprising, referencing two or more run configuration packages in a Meta layer.

12. The computer-implemented method according to claim 1, further comprising, executing the system assessment of run configuration packages referenced in the Meta layer in parallel.

13. The computer-implemented method according to claim 1, further comprising reading at least one output of the system assessment and modifying the at least one output to comprise a predefined output format via the application protocol interface.

14. The computer-implemented method according to claim 13, the predefined output format being an application tool-independent format.

15. The computer-implemented method according to claim 1, further comprising, analyzing and reporting of the system assessment based on the output.

16. The computer-implemented method according to claim 1, further comprising, version controlling the run configuration package.

17. The computer-implemented method according to claim 1, further comprising, version controlling the Meta layer.

18. A computer system comprising:
    a processor;
    memory storing instructions executed by the processor to carry out method steps comprising:
        creating at least one run configuration package comprising at least a specification hierarchy, the specification hierarchy being linked to a plurality of specification data objects for setting an assessment environment;
        creating an application protocol interface comprising a generic code portion and an application-specific code portion,
        the generic code portion being configured to provide a standardized instruction to the application-specific code portion,
        the application-specific code portion being configured to modify a format of the plurality of specification data objects linked to the specification hierarchy for an assessment application tool to be utilized;
        receiving an input for building the assessment environment from the run configuration package referencing the assessment application tool via the application protocol interface; and
        building the assessment environment based on the input.

19. A non-transitory computer-readable medium comprising instructions stored in a memory and executed by a processor to carry out the method steps comprising:
    creating at least one run configuration package comprising at least a specification hierarchy, the specification hierarchy being linked to a plurality of specification data objects for setting an assessment environment;

creating an application protocol interface comprising a generic code portion and an application-specific code portion, the generic code portion being configured to provide a standardized instruction to the application-specific code portion, the application-specific code portion being configured to modify a format of the plurality of specification data objects linked to the specification hierarchy for an assessment application tool to be utilized;

receiving an input for building the assessment environment from the run configuration package referencing the assessment application tool via the application protocol interface; and building the assessment environment based on the input.

* * * * *